No. 804,922. PATENTED NOV. 21, 1905.
N. H. BLOOM.
RIDING ATTACHMENT FOR AGRICULTURAL IMPLEMENTS.
APPLICATION FILED JUNE 7, 1905.
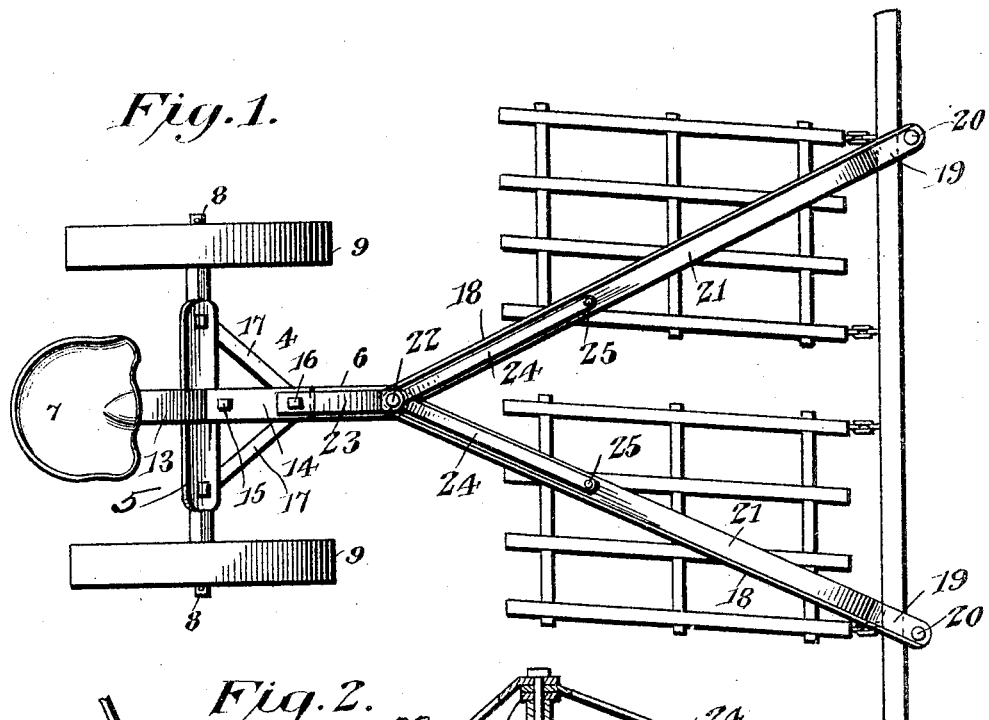
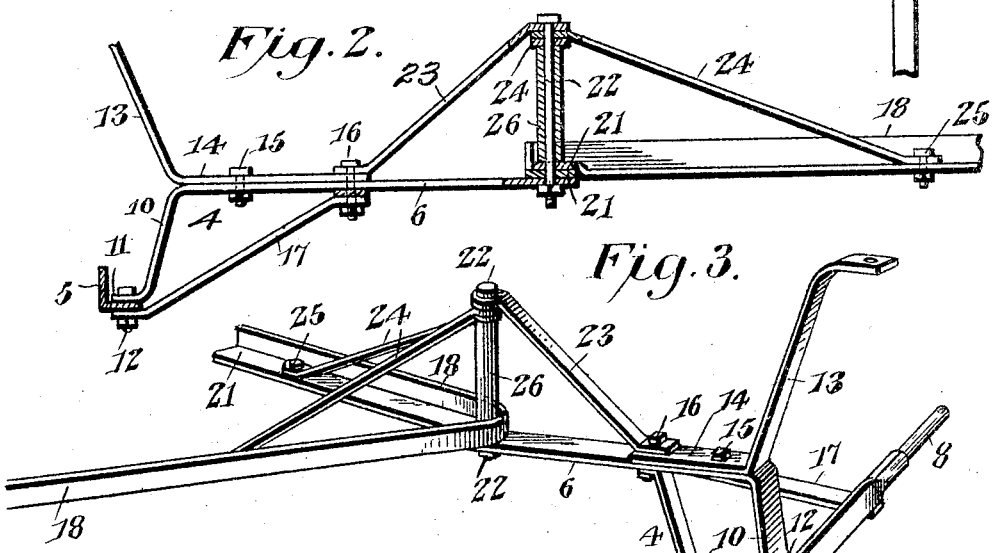
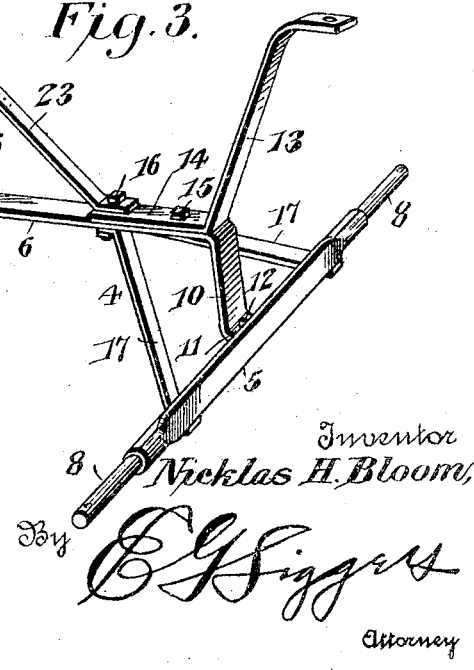
Witnesses
Jas. E. McCathran
B. G. Foster
Inventor
Nicklas H. Bloom,
By C. G. Siggers
Attorney

UNITED STATES PATENT OFFICE.

NICKLAS H. BLOOM, OF NASHUA, IOWA.

RIDING ATTACHMENT FOR AGRICULTURAL IMPLEMENTS.

No. 804,922.　　Specification of Letters Patent.　　Patented Nov. 21, 1905.

Application filed June 7, 1905. Serial No. 264,115.

*To all whom it may concern:*

Be it known that I, NICKLAS H. BLOOM, a citizen of the United States, residing at Nashua, in the county of Chickasaw and State of Iowa, have invented a new and useful Riding Attachment for Agricultural Implements, of which the following is a specification.

This invention relates to improvements in means adapted to be coupled to a harrow or other agricultural implement and constituting a vehicle on which the driver may ride.

The principal object is to provide a novel structure of an efficient character that may be cheaply manufactured, yet is strong and durable, can be readily attached to an agricultural implement, and will properly follow the same without regard to the turns or variations in the path of movement of the implement.

A form of construction that is at present considered preferable is illustrated in the accompanying drawings, wherein—

Figure 1 is a plan view of the attachment applied to a harrow. Fig. 2 is a longitudinal sectional view, on an enlarged scale, through the rear portion of the same. Fig. 3 is a perspective view of said rear portion, the wheels being removed.

Similar reference-numerals designate corresponding parts in all the figures of the drawings.

In the embodiment illustrated a truck (designated as a whole by the reference-numeral 4) is employed, said truck comprising an axle 5, a tongue 6, and a seat 7, mounted thereon. The main body of the axle is formed of angle-iron provided at its ends with spindles 8, secured in place by swaging or bending the ends of the angle-iron body about the inner ends of said spindles. On these spindles are journaled the usual ground-wheels 9. The tongue 6 has its rear portion downturned, as shown at 10, the terminal thereof being offset, as shown at 11, and secured by a bolt 12 to the horizontal flange of the axle. The seat 7 is carried by a yielding spindle 13, the lower end of said spindle being offset, as shown at 14, and located directly upon the tongue 6, being secured thereto by bolts 15 and 16. Braces 17 have their rear ends connected to the end portions of the axle 5, while their front ends are disposed in overlapping relation beneath the central portion of the tongue 6, being secured to said tongue by the bolt 16.

Divergently-disposed reach-bars 18, formed of angle-iron, have downturned front ends 19 provided with eyes to receive bolts 20, whereby said reach-bars are connected to a harrow or other agricultural implement. These reach-bars have horizontally-disposed flanges 21, which at their rear ends are disposed in overlapping relation with each other and with the front end of the tongue 6. An upright pivot-bolt 22 passes through these overlapped elements and projects beyond one side of the same, preferably above, as shown. A brace 23, secured at its rear end to the tongue of the truck by means of the bolt 16, extends upwardly and forwardly and has its front end connected to the upper end of the pivot-bolt 22. Other braces, having their rear ends secured in overlapping relation by the pivot-bolt 22, have their front ends bolted or otherwise fastened, as shown at 25, to intermediate portions of the reach-bars. A spacing-sleeve 26, mounted on the pivot-bolt, separates the ends of the braces 23 and 24 from the connected reach-bars.

As the body of the structure is formed of angle-iron or strips, it will be noted that the device can be manufactured at small cost and the parts easily assembled. At the same time the attachment is light in weight though very durable. Moreover, it can be easily attached to an agricultural implement and will properly follow the same not only in a direct line, but also in making turns. The pivotal connection between the truck and rear bars permits the relative movement of the harrow or other implement with respect to the truck and yet maintains said truck in proper relation with respect thereto.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a riding attachment of the class described, the combination with convergently-disposed reach-bars, of a truck, an upright pivot connecting the reach-bars to each other and to the truck, and brace connections between the pivot and the reach-bars and truck.

2. In a riding attachment of the class described, the combination with convergently-disposed reach-bars, of a truck including a tongue, said tongue and reach-bars being arranged one against the other in overlapping relation, and an upright pivot passing through and connecting the overlapped portions of the reach-bars to each other and to the tongue.

3. In a riding attachment of the class described, the combination with separate convergently-disposed reach-bars having means at their front ends for attaching the same to an agricultural implement and having their rear ends overlapped and arranged against each other, of a truck including a portion having its front end disposed in substantially the same vertical plane with the overlapped ends of the reach-bars, and an upright bolt passing through said overlapped ends and tongue.

4. In a riding attachment of the class described, the combination with reach-bars formed of angle-iron and having substantially horizontal flanges, the rear ends of which are overlapped, of a truck having a portion with which the flanges overlap, and a pivot connecting the flanges and overlapped portion of the truck.

5. In a riding attachment of the class described, the combination with a reach-bar, of a truck, a pivot connecting the reach-bar and truck, and a brace connected to the reach-bar between its ends and to the pivot.

6. In a riding attachment of the class described, the combination with a reach-bar, of a truck, an upright pivot connecting the reach-bar and truck and projecting beyond the same, and a brace connected to the reach-bar between its ends and to the projecting portion of the pivot.

7. In a riding attachment of the class described, the combination with a reach-bar, of a truck, an upright pivot connecting the reach-bar and truck and projecting beyond the same, a brace connected to the reach-bar between its ends and to the projecting portion of the pivot, and a spacing device interposed between the connected truck and bar and the brace.

8. In a riding attachment of the class described, the combination with reach-bars, of a truck having a tongue, said bars and tongue being disposed in overlapping relation, an upright bolt connecting the bars and the tongue and projecting on one side of the same, and braces secured to the reach-bars between their ends and connected to the projecting portion of the pivot.

9. In a riding attachment of the class described, the combination with convergent reach-bars having overlapped rear ends, of a truck having a tongue, said bars and tongue being disposed in overlapping relation, an upright pivot-bolt connecting the bars and tongue and projecting from one side of the same, convergent braces secured to the reach-bars between their ends and having overlapped ends connected to the projecting portion of the pivot-bolt, and a spacing-sleeve on said bolt.

10. In a riding attachment of the class described, the combination with convergently-disposed reach-bars having overlapped rear ends, of a truck including a tongue disposed in overlapping relation with the bars, an upright pivot-bolt passing through the tongue and bars, convergently-disposed braces connected to said bolt and to intermediate portions of the reach-bars, and another brace connected to the pivot-bolt and to the truck.

11. In a riding attachment of the class described, the combination with convergently-disposed reach-bars formed of angle-iron and having overlapped flanges, of an upright pivot-bolt passing through the flanges, a truck having a tongue pivoted on said bolt, a spacing-sleeve mounted on the bolt, a brace connected to the bolt, a seat having a standard mounted on the tongue, means for fastening the brace and seat to the tongue, and other braces connecting the pivot-bolt and reach-bars.

12. In a riding attachment of the class described, a truck comprising an axle, a tongue connected thereto, braces connecting the axle and tongue, a seat mounted on the tongue, a common fastener for securing the seat and braces to the tongue, in combination with a reach-bar, and means for connecting the reach-bar to the tongue.

13. In a riding attachment of the class described, a truck comprising an axle, a tongue having a downturned rear end connected to the axle between its ends, braces connecting the end portions of the axle and tongue, a seat mounted on the tongue, and means for connecting the tongue to an agricultural implement.

14. In a riding attachment of the class described, a truck comprising an axle, a tongue connected to the axle between its ends, braces connecting the end portions of the axle and tongue, a seat having a standard that rests on the tongue, a bolt passing through the standard, the tongue and the braces, reach-bars, and a pivot connecting the reach-bars and tongue.

15. In a riding attachment of the class described, a truck comprising an axle, a tongue connected thereto, a reach-bar, a pivot connection between the reach-bar and tongue, a seat having a standard mounted on the tongue, a brace connected to the pivot, and a bolt passing through the brace, the standard, and the reach-bar.

16. In a riding attachment of the class described, the combination with convergently-disposed reach-bars, of a truck comprising an axle, a tongue secured to the axle and having its front end disposed in overlapping relation with the reach-bars, an upright connection between the tongue and reach-bars, and braces secured to the axle and to the tongue.

17. In a riding attachment of the class described, the combination with a truck comprising an axle, a tongue secured thereto, and a seat mounted on the tongue, of convergently-disposed reach-bars, a pivotal connection between the reach-bars and the tongue, and braces between the axle and the tongue, between the tongue and the pivotal connection, and between the reach-bars and the pivotal connection.

18. In a riding attachment of the class described, the combination with a truck comprising a wheeled axle, a tongue secured thereto and projecting in advance of the same, and a seat mounted on the tongue, of convergently-disposed reach-bars having overlapped rear ends associated with the front end of the tongue, an upright pivot-bolt connecting the reach-bars and tongue, braces secured to the end portions of the axle and connected to the tongue, a brace connected to the tongue and to the pivot-bolt, and braces connected to the reach-bars and the pivot-bolt, said braces permitting the relative swinging movement between the reach-bars and tongue.

19. In a riding attachment of the class described, the combination with a truck comprising a wheeled axle, a tongue secured thereto at an intermediate point of the axle and projecting in advance thereof, convergently-disposed reach-bars having their rear ends disposed one against the other and against the tongue, and a vertical pivot-bolt connecting the rear or inner ends of the reach-bars to the front end of the tongue.

In testimony that I claim the foregoing as my own I have hereto affixed my signature in the presence of two witnesses.

NICKLAS H. BLOOM.

Witnesses:
W. B. SIMPSON,
R. F. WENTWORTH.